(12) United States Patent
Breuer

(10) Patent No.: US 10,623,131 B2
(45) Date of Patent: Apr. 14, 2020

(54) METHOD FOR HANDLING OF JAMMING AFFECTING A WIRELESS DEVICE

(71) Applicant: GEMALTO M2M GMBH, Munich (DE)

(72) Inventor: Volker Breuer, Boetzow (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 0 days.

(21) Appl. No.: 15/768,877

(22) PCT Filed: Nov. 4, 2016

(86) PCT No.: PCT/EP2016/076643
§ 371 (c)(1),
(2) Date: Apr. 17, 2018

(87) PCT Pub. No.: WO2017/080916
PCT Pub. Date: May 18, 2017

(65) Prior Publication Data
US 2019/0132074 A1    May 2, 2019

(30) Foreign Application Priority Data
Nov. 9, 2015  (EP) .................................... 15193587

(51) Int. Cl.
*H04W 72/00* (2009.01)
*H04K 3/00* (2006.01)
*H04W 36/06* (2009.01)

(52) U.S. Cl.
CPC ............... *H04K 3/226* (2013.01); *H04K 3/88* (2013.01); *H04W 36/06* (2013.01); *H04K 2203/16* (2013.01)

(58) Field of Classification Search
CPC combination set(s) only.
See application file for complete search history.

(56) References Cited

U.S. PATENT DOCUMENTS

2009/0067340 A1*  3/2009  Jakobsen ............... H04K 3/226
                                                          370/252
2013/0344823 A1* 12/2013  Almgren ............... H04W 12/12
                                                          455/90.1
(Continued)

FOREIGN PATENT DOCUMENTS

EP    1 917 750       5/2008
EP    2 403 186 A1    1/2012
(Continued)

OTHER PUBLICATIONS

International Search Report (PCT/ISA/210) dated Feb. 8, 2017, by the European Patent Office as the International Searching Authority for International Application No. PCT/EP2016/076643.
(Continued)

*Primary Examiner* — Justin Y Lee
(74) *Attorney, Agent, or Firm* — Buchanan Ingersoll & Rooney PC

(57) ABSTRACT

A method for handling of a jamming condition affecting a wireless device operating in normal coverage mode includes:
  determining a base station supporting enhanced coverage mode, providing signals sufficient for decoding in enhanced coverage mode,
  receiving enhanced coverage system information from said enhanced coverage base station,
  storing data relating to received enhanced coverage system information broadcast and/or the enhanced coverage base station,
in case of detection of a jamming condition affecting signals from the current base station:
  checking ability to decode signals from said enhanced coverage base station indicated by said stored data,
  in case downlink signals of said enhanced coverage base station are decodable in enhanced coverage, starting (Continued)

operation with said enhanced coverage base station in enhanced coverage mode, and sending a jamming indication message to a remote server accessible via the cellular network by means of said enhanced coverage base station.

15 Claims, 3 Drawing Sheets

(56) References Cited

U.S. PATENT DOCUMENTS

| | | | |
|---|---|---|---|
| 2014/0204766 A1* | 7/2014 | Immendorf | H04W 24/04 370/242 |
| 2014/0342741 A1* | 11/2014 | Li | H04W 52/50 455/437 |
| 2015/0024737 A1 | 1/2015 | Fox et al. | |
| 2015/0050924 A1* | 2/2015 | Gotou | H04W 8/18 455/418 |

FOREIGN PATENT DOCUMENTS

| | | |
|---|---|---|
| EP | 2 453 582 A1 | 5/2012 |
| WO | WO 2014/076283 A1 | 5/2014 |

OTHER PUBLICATIONS

Written Opinion (PCT/ISA/237) dated Feb. 8, 2017, by the European Patent Office as the International Searching Authority for International Application No. PCT/EP2016/076643.

* cited by examiner

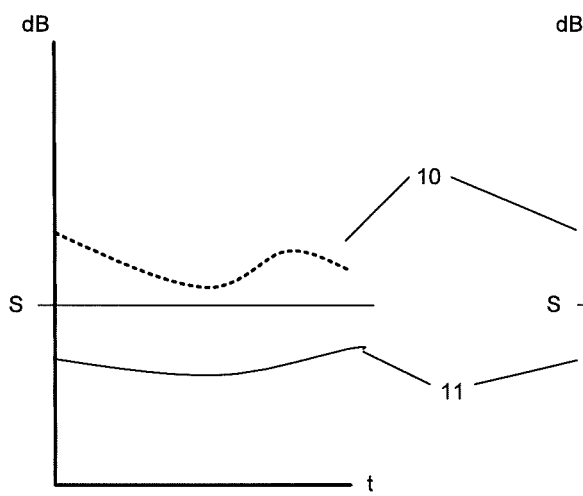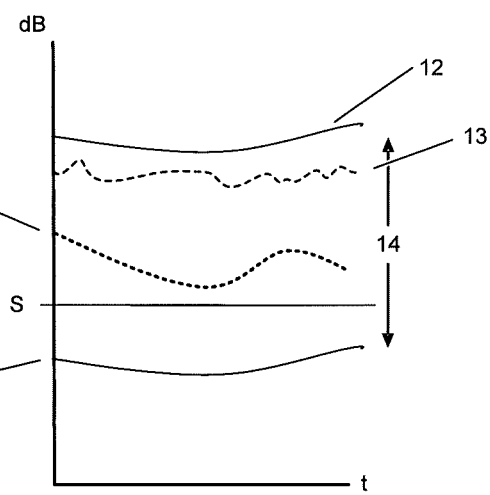

METHOD FOR HANDLING OF JAMMING AFFECTING A WIRELESS DEVICE

FIELD OF THE INVENTION

The present invention relates to a method for handling of a jamming condition affecting a wireless device.

The invention also pertains to a wireless device using said method.

BACKGROUND OF THE INVENTION

In the field of wireless communication it is known that the most vulnerable part of the communication link is the air interface. It is a widespread technique for all generations of cellular wireless communication to disturb communication by sending high power noise signals over a couple of bands used by wireless devices and their serving base stations of the cellular network the wireless devices are operating in. This so-called jamming is easily conducted by cheap devices.

The risk of that jamming is that alarm systems with wireless connection capability or theft protection units of a car could be compromised. In that case no alarm message can be sent to alarm centers, which makes it easy for housebreakers or car thieves to eliminate such security measures.

By now methods are known which help as fast as possible detecting the jamming situation. With this detection by now only local measures, like activating the car horn, deactivating the motor or turning on warning lights were possible. All suggested solutions of sending a message to a remote center do not work in practice or need a second, in particular wired, connection.

Methods to reliably detect the jamming situation are already known in the art. In the area of 2G, that is GSM, GPRS or EDGE, such a method is described in EP1917750, which is incorporated in this invention by reference.

In the 3G field, in particular UMTS, WCDMA, HSDPA etc., it is suggested a method for detecting a jammer in EP 2453582, which is incorporated in this invention by reference.

In the area of 4G, that is LTE and LTE-advanced, etc., such a method is described in WO2014/076283, which is incorporated in this invention by reference.

It is therefore the goal of present invention to overcome the mentioned disadvantages and to propose a solution for handling a jamming condition at the wireless device that way, that a remote service center is contacted in the event of a detected jamming condition.

Present invention aims to suggest methods based on enhanced coverage applicable to LTE but same measures can also be applied to GSM and other technologies.

Further alternative and advantageous solutions would, accordingly, be desirable in the art.

SUMMARY OF THE INVENTION

For this it is according to a first aspect of the invention suggested a method for handling of a jamming condition affecting a wireless device operating according to claim 1. It is further suggested according to a second aspect of the invention a wireless device according to claim 8.

The inventive solution is based on new developments of wireless cellular technology standards, in particular LTE-Cat1 which is mainly designed for lowcost (LC) devices in the field of machine type communication (MTC). Those devices are often situated in areas with bad reception conditions, e.g. metering devices in cellars.

As part of the 3GPP Release 13 definition for such LC devices it was suggested the so-called enhanced coverage (EC) mode. This solves said reception issues by allowing communication that way that by many repetitive receptions of the same data packets the receiver aggregates sufficient power until the data packets can be reliably read from the receiver. As a precondition the wireless device and the serving base station need to agree upon registration of the wireless device at the base station that on both sides of the air interface the enhanced coverage mode is activated. A precondition for that is that the base station supports EC devices, otherwise they were barred on that base station. The enhanced coverage support is performed up to a certain coverage enhancement limit which is also indicated by the base station, i.e. corresponding to the maximum of repetitions and resources a base station would spend for a user to achieve a certain coverage enhancement depth.

Further it is decided in the standardization that not only low cost devices can use this enhanced coverage mode, but also those who are capable of supporting normal coverage mode and consequently the capability to switch between normal coverage mode and enhanced coverage mode.

Here comes the invention into play. It is therefore suggested a method for handling of a jamming condition affecting a wireless device operating in normal coverage mode with a first base station of a cellular network, wherein the wireless device being configured for operating in enhanced coverage mode, comprising the steps for the wireless device of:

determining of at least one enhanced coverage base station, which is a base station supporting enhanced coverage mode, providing signals sufficient for decoding in enhanced coverage mode, receiving enhanced coverage system information broadcast from said enhanced coverage base station storing data relating to at least one of received enhanced coverage system information broadcast and the enhanced coverage base station, in case of detection of a jamming condition affecting signals from current first base station:

checking ability to decode signals from said enhanced coverage base station indicated by said stored data for operating in enhanced coverage mode, in case downlink signals of said enhanced coverage base station are decodable in enhanced coverage, starting operation with said enhanced coverage base station in enhanced coverage mode, and sending jamming indication message to a remote server accessibly via the cellular network by means of said enhanced coverage base station.

The invention is based on the consideration that through the noise created by a jammer with the enhanced coverage mechanisms there is with a certain amount of repetitions still a chance to decode the signals of the base station at the wireless device. Hence, the communication between a base station, belonging to a cellular network, and a wireless device which both operate in enhanced coverage mode can be continued. This is in particular true as generally only the downlink is jammed in order to make the jamming not visible to the network operator.

For making use of this consideration it is suggested that a wireless device which supports enhanced coverage mode, but operates with a first base station in normal coverage mode, determines after registration on the first base station if enhanced coverage base stations are available in the proximity.

The first base station and the wireless device are in particular supporting the long term evolution (LTE) standard, in particular such for lowcost devices, also known as LTE Cat0. Other cellular technology standards supporting enhanced coverage or a variant thereof are also foreseen.

For said determination, the wireless device preferably takes the following measures. If an enhanced coverage supporting base station is in proximity of the wireless device, it tunes its receiver to said base station. In the following it reads the system information broadcast for enhanced coverage from the base station. Typically the system information are broadcasted in system information blocks (SIBs), where the different information are distributed on several blocks. For enhanced coverage base station special system information blocks for enhanced coverage (EC-SIBs) are foreseen.

For that the wireless device needs to operate shortly with that base station in enhanced coverage mode.

Additionally it is foreseen as an advantageous embodiment wherein the enhanced coverage base station is the same base station as the first base station.

That means that the base station the wireless device is currently camping on, hereinafter the serving base station, supports the both operation modes of normal coverage and enhanced coverage. It is therefore advantageous when a wireless device camps in normal coverage mode on such a base station, that in course of camping on such a base station, the wireless device also determines if the serving base station supports enhanced coverage mode. Generally the same procedure needs to be applied as stated above, as if a different base station would broadcast the EC-SIB.

Irrespective of from which base station the data are received, at least one set of data relating to the received and decoded EC-SIB and the respective base station is then stored in a memory of the wireless device for later usage. In particular such storage is carried out in a permanent flash memory. But as some data need to be re-read after each power off and restart, at least for those data it would also suffice to store in volatile memory.

With that storing the wireless device is in the first place prepared for detecting a jamming condition and take necessary measures. However, in case some time has passed, the stored information might be outdated.

Hence it is proposed in another preferred embodiment a method, further comprising the step, after storing said data, of regularly monitoring said enhanced coverage system information broadcast for a change indication, indicating a change in the enhanced coverage system information broadcast, upon detection of a change indication repeating said receiving and storing steps.

With this embodiment it is assured that the wireless device has the most up to date information available regarding the enhanced coverage capabilities. In particular the EC-SIB comprises a flag, the so-called SystemInfoValue tag, that indicates if a change has happened compared to the previously read submission. The SIBs are distributed over a couple of broadcast blocks, and in the first and preferably most frequently broadcasted SIB, the SystemInfoValue tag is broadcasted. Whenever any of the SIB fields has changed, then the SystemInfoValue tag is incremented. Hence by reading that one SystemInfoValue tag is sufficient for the wireless device to figure out, if the rest of the EC-SIBs need to be read again.

This embodiment in particular is applicable to stationary devices, which do not change its position relative to the neighboring base stations.

However regularly or triggered by a detecting position change this monitoring would also solve the issue for a wireless device which is not stationary.

Between the last complete reading and storing of the EC-SIBs and the next method steps there might be last some time. The next step is triggered by detecting a situation where it is most likely that the wireless device is affected by a jamming condition, that means signals from the serving base station cannot be decoded anymore, although there is sufficient energy in the frequency band occupied by the downlink signals from the wireless device.

As set out before, for different cellular technology standards different methods are known for reliably detecting a jamming situation. As these known methods are incorporated here by reference this is not detailed out here.

Once the jamming condition is detected the following steps are carried out. First it is checked if the wireless device can decode signals from at least one of the enhanced coverage base stations, for that data were stored in earlier step.

For that in particular stored data are used to tune the receiver to said base station, i.e. the corresponding center frequency of said carrier, synchronization and then make an attempt to receive and decode signals in enhanced coverage mode by using stored data. The information concerning EC-SIB 1 and its position within the frequency and of said EC-base station can be derived from the master-information block (MIB), which is initially read by the wireless device. Once the EC-SIB1 is decoded, the other SIB position can be derived. Further it is advantageous to store the SystemInfoValue tag within the EC-SIB1. A change in the SIBs is detected when a different SystemInfoValue tag is received.

For checking if signals from an enhanced coverage base station can be decode it is sufficient to receive a broadcast, in particular SIBs.

In a particular preferred embodiment it is proposed the step of checking for ability to decode signals comprises carrying out a reselection operation.

This is advantageous as it provides a higher reliability and saves time, as it is anyhow envisaged to reselect to a decodable base station. So no separate or redundant steps need to be carried out.

When this checking is successful for one base station, then the wireless device starts operating with this base station in enhanced coverage mode.

As part of this operating the wireless device is sending a jamming indication message to a remote server. That server is reachable through the respective base station and the cellular network the base station belongs to.

The remote server is in particular part of the cellular network.

Alternatively the remote server is reachable through the internet or a dedicated connection with the cellular network, and preferably is hosted by the alarm service center, the wireless device is registered to.

The jamming indication message in particular comprises information that a normal alarm message would also include.

Through the enhanced coverage mode, only a small bandwidth in terms of transmittable data amounts in a time unit can be achieved. It is therefore not expected that a voice call or data transmission connection can be continued.

But for the envisaged jamming indication message, in particular when it is reduced to the absolutely necessary data, it is only a question of time to deliver this to the base station and eventually to the remote server respectively the alarm center.

In an in particular advantageous embodiment it is proposed a method wherein upon detecting of a jamming condition of enhanced coverage base station, indicating in jamming indication message whether signalling received from the enhanced coverage base station being affected of jamming.

As part of this embodiment it is detected by the wireless device, preferably during the step of checking the ability to decode signals, that the signals received from the enhanced coverage base station, that will be used for submitting the jamming indication message, is also affected by a jamming condition.

This information is according to this embodiment also included in the jamming indication message. Should the first base station and the enhanced coverage base station be different, thus the remote server gets an indication concerning two base stations where wireless devices are affected by a jamming condition.

In another preferred embodiment it is proposed that the first base station is operating in a different radio technology than the enhanced coverage base station.

With that embodiment it is clarified that the starting of operation with the enhanced coverage base station also considers an inter-RAT reselection. In particular it is not necessary that the first base station operates in a cellular technology standard for that an enhanced coverage mode is standardized.

For the time being, enhanced coverage is known for LTE, while for 2G networks a variant of enhanced coverage is currently in definition, called extended coverage. For 3G such is by now not known.

Hence, this would mean the possibility that a wireless device is operating on a 3G base station, while it detects both LTE and 2G base stations in the proximity operating in enhanced resp. extended coverage mode.

In another advantageous embodiment it is suggested a method wherein said jamming indication message is sent by means of the random access channel.

The random access channel is in LTE foreseen as a way of uplink signalling from the wireless device in special situations, in particular when it has not resources assigned for sending requests or messages to the base station or lost timing synchronization. The random access channel procedure is possible without such assigned resources and starts with a transmission of a random access preamble on the physical random access channel (PRACH).

As the downlink from the base station is disturbed by the jamming, it is according to this embodiment suggested to minimize the necessary downlink control signals, in particular dedicated resource allocations, and allow to use the random access procedure via the RACH to quickly be able to submit the jamming indication message. The RACH procedure for enhanced coverage generally does not differ from the normal coverage.

If the cellular network after receiving such a jamming indication message forwards the message to a remote service center, or takes it directly into account, is transparent for the suggested embodiment, but both foreseen in the invention.

According to the second aspect of the invention it is proposed a wireless device operating in normal coverage mode with a first base station of a cellular network, further configured for operating in enhanced coverage mode, wherein the wireless device is configured for handling a jamming condition affecting the wireless device to determine of at least one enhanced coverage base station, which is a base station supporting enhanced coverage mode, providing signals sufficient for decoding in enhanced coverage mode, receive enhanced coverage system information broadcast from said enhanced coverage base station store data relating to at least one of received enhanced coverage system information broadcast and the enhanced coverage base station, in case of detection of a jamming condition on current first base station:

check for ability to decode signals of said enhanced coverage base station indicated by said stored data for operating in enhanced coverage mode, in case downlink signals of said enhanced coverage base station are decodable in enhanced coverage, start operation with said enhanced coverage base station in enhanced coverage mode, and send jamming indication message to a remote service by means of said enhanced coverage base station.

The wireless device according to this aspect is foreseen as a special wireless receive or transmission unit, in particular a machine-type-communication (MTC) device, implementing the method of the first aspect of the invention.

Hence it shares the advantages of the first aspect of the invention and its embodiments.

In a particular preferred embodiment the wireless device is an alarming device, and the jamming indication message is sent to an alarm center.

That type of alarming device preferably is dedicated for prevent unauthorized use, intrusion or fraud of a house, a car or other objects of value. For that the alarming device is anyhow configured to send alarm messages to the alarm center. The alarm center is a dedicated remote service center for providing appropriate assistance or take emergency measures should an alarm message arrive.

The alarm message preferably comprises an identification of the sending device, an indication of the type of message, e.g. manually or automatically detected, and a location information, preferably co-ordinates, that latter in particular for moving alarming devices.

Hence, the jamming indication message is a special alarm message. It may hence include as a special type of message the indication that sending the alarm message was triggered by detecting a jamming condition.

With a further preferred embodiment it is proposed that the wireless device is operated stationary.

With that embodiment the wireless device is operated as fixed device, in particular as part of a building, and in particular the wireless device is configured to operate like that.

Hence, the wireless device does not need to repeat the determination of neighbor base stations that often, as the situation may rarely change. Hence, the once stored information regarding neighbouring base stations supporting enhanced coverage mode should be quite stable over a while.

Although a strong jammer close to the wireless device might lead to an oversteering situation, and hence would drown the downlink signals from the base station, nevertheless with the proposed method there is a good chance that the jammed wireless device might still communicate with a base station in enhanced coverage mode and submit a jamming warning message. Thus it increases the security and reliability of the alarm or theft protection system.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 2 shows power/time diagrams indicating the general assumption on which the inventive method is based;

FIG. 1 schematically shows a wireless device 3 of the type to which the present invention is applied as an embodiment in area of several base stations 2a, 2b, 2c, 2d being part of the cellular network 1. The wireless device 3 is generally supposed to operate in normal coverage mode, and as such is able to camp on a base station supporting normal coverage mode as well.

Figure 1:
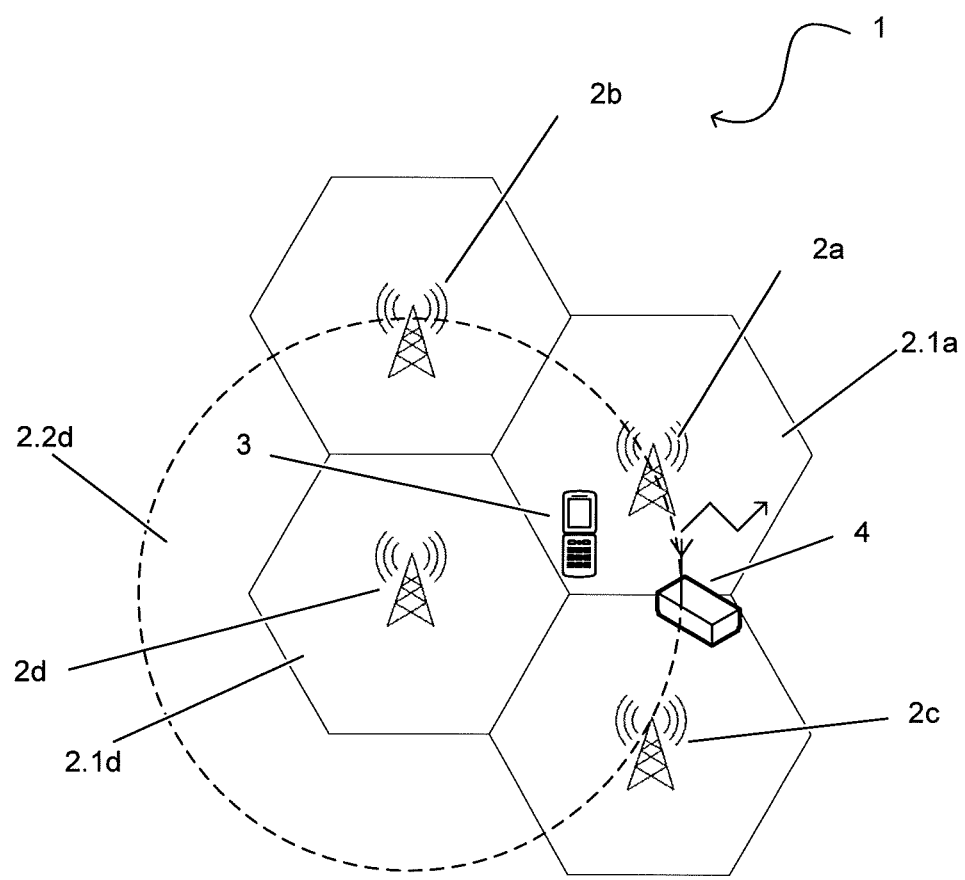
FIG. 1 represents a wireless device of the type to which the present invention is applied as an embodiment in the situation addressed by an embodiment of the inventive method.

In the shown situation, the wireless device 3 is situated in cell area 2.1a of base station 2a. Consequently the wireless device 3 when powered on preferably camps on base station 2a.

In this exemplifying embodiment the wireless device 3 is an alarm device, e.g. as part of a car, which is configured to send a message or launch a call to an alarm center which is reachable by using the connectivity means provided by the cellular network 1 in the case it detects an intruder.

In that case, a sensor of the car or as part of the wireless device 3 is adapted to detect any unauthorized handling of the car, like opening a door without a key or breaking a window, and in response to send a message or launch a call. Depending on the system, that situation is typically indicated to the intruder, in order to let him leave the car alone.

An advantaged intruder who detects upfront that the car is secured by such an alarm system would want to prevent the alarm system to launch the alarm message over the cellular network. For that purpose he places a jammer 4 in the proximity of the car, and consequently the wireless device 3.

The jammer 4 works that way, that it emits white noise with locally strong power in a certain range of frequency bands. Typically the frequency bands are only addressing the downlink frequency bands of a certain cellular technology standard (where these are distinguishable) in order to not make the cellular network 1 aware of the intrusion attempt.

Through that emitted noise the wireless device 3 cannot listen to signals from the base station 2a and would consequently lose the connection as for each envisaged transmission it requires a reception from the base station over various channels.

In order to face this situation the wireless device 3 according to the exemplifying embodiment of the invention previously prepared itself for maintaining its operability with the cellular network even in case of a jamming situation.

For that the wireless device 3 is configured to detect that a jammer 4 has started interfering the air interface with the base station 2a.

Further it is configured to determine in particular right after registration in the cellular network on base station 2a, if a base station is in the proximity which supports enhanced coverage mode.

In the shown situation this applies for base station 2d. The shown circle 2.2d indicates that area of coverage in enhanced coverage mode, which visibly enlarges the coverage compared to the normal coverage cell area 2.1d.

Consequently the wireless device 3 is prepared that in the event of detecting a jamming condition, it will carry out a reselection to base station 2d in enhanced coverage mode and send out a jamming indication message.

FIG. 2a+2b show a comparison of two diagrams of power and time depicting measurable power in a certain band at the wireless device 3.

In FIG. 2a it is visible the power detectable for wireless device 3 in the situation of FIG. 1 of normal coverage signals from base stations 2a and 2d. The power graph 10 for base station 2a, which is the serving cell, is higher than the power graph 11 for base station 2d.

Base station 2d is capable of operating in enhanced coverage mode. Basically, enhanced coverage does not mean that the signals are transmitted with higher power. Rather due to multiple repetitions of the same signal an accumulation gain can be achieved for the signals, however this requires an enormous resource consumption. That's why wireless devices prefer to operate under normal conditions if an NC cell is above the suitability (S) criteria.

Hence, it does not matter if the power graph 11 shows the power in normal or enhanced coverage mode.

It is visible that the power graph 11 is lower than the suitability level S. Hence, the wireless device cannot decode the signals transmitted from base station 2d without accumulation gain and also would currently not camp on that cell.

FIG. 2b shows the situation of the same wireless device 3 in the same situation as in FIG. 2a, but now when the wireless device is affected by a jammer. This jammer emits a white noise with the power indicated by the reception graph 13. It is visible that the wireless device has no way to decode the signals from base station 2a, indicated with power graph 10.

Now the enhanced coverage effect comes into play. As the enhanced coverage mode is based on the repetitions of the same signals transmitted, the transmissions from base station 2d are frequently repeated. This leads to the situation that effectively through the repetition an accumulation gain 14 is achieved. With that accumulation gain 14, the signals of the base station 2d, transmitted in enhanced coverage mode, result in the end in reception graph 12, which lies higher than the reception graph 13 of the jammer.

Figure 3:
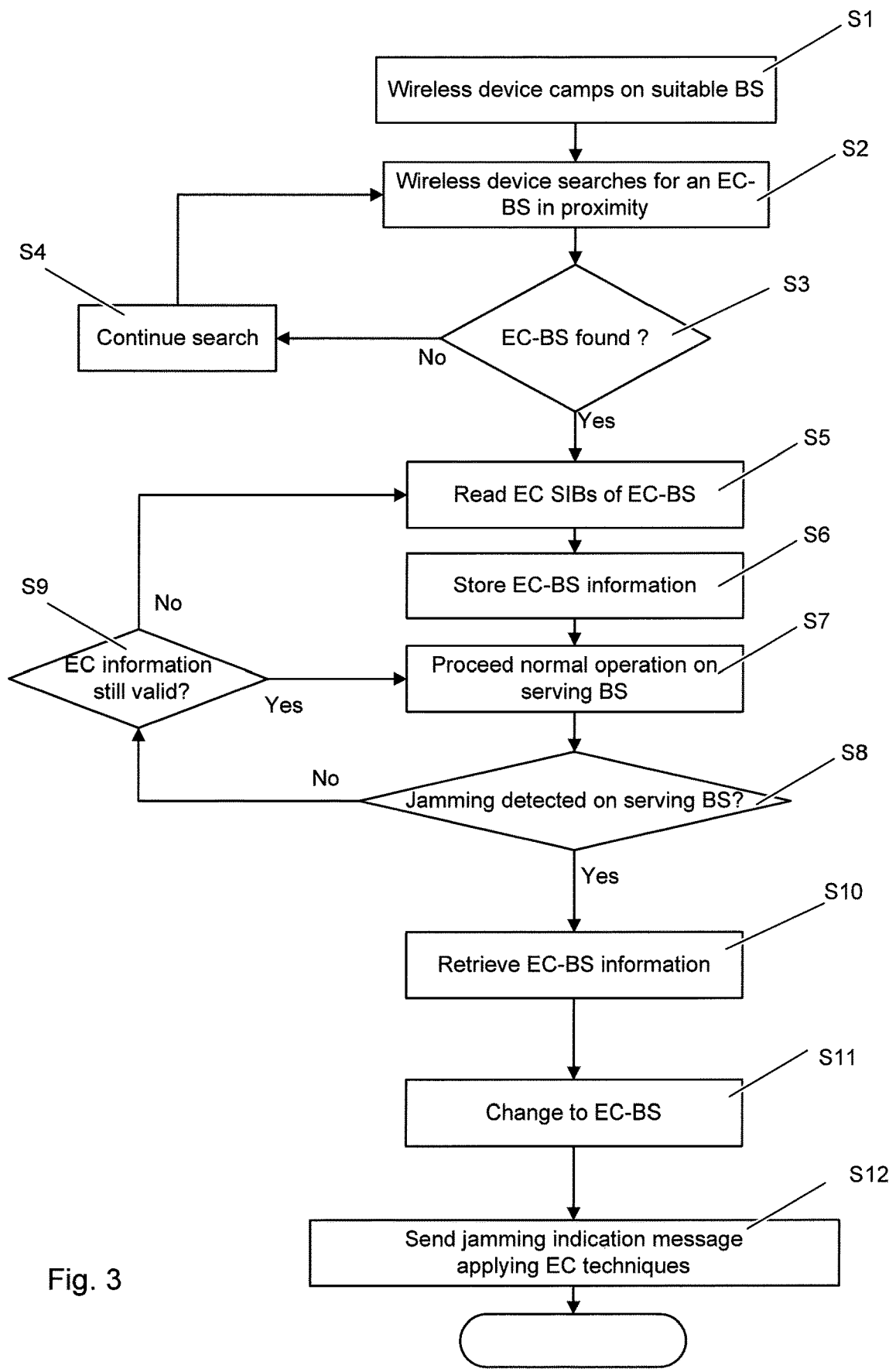
FIG. 3 shows a flow diagram illustrating an advantageous embodiment of the proposed method.

The general procedure is shown in FIG. 3 in a flow diagram showing an exemplifying embodiment of the inventive method.

It starts in step S1 with the wireless device camping on a suitable base station (BS) in normal coverage mode. This is effectively the situation shown in FIG. 1 between wireless device 3 and base station 2a.

In this exemplifying embodiment the wireless device right after camping on the normal coverage base station carries out a search operation S2 for enhanced coverage base stations (EC-BS) in the proximity. That means, it is checked if there are decodable signals available.

In step S3 it branches to step S4, when no such signals are retrieved. In this embodiment it is proposed to continue searching in step S4. This is preferably done time triggered, and in the meantime the wireless device has resources available for other tasks, in particular the operation on the normal coverage base station, it is currently camping on.

Also an alarm or otherwise indication is helpful in this situation, as e.g. a car driver parking his car has an indication, that his car would at a current position not be secured, when no enhanced coverage cell is available.

Should decodable signals be found in step S2, then the process flow branches in decision step S3 to step S5. The following operation are carried out for each enhanced coverage base station detected in step S2. For simplicity reasons it is in the following assumed that only one enhanced coverage base station—analogue to base station 2d in FIG. 1—is found. Hence, in step S5 the enhanced coverage system information blocks (EC-SIB) broadcasted by the found EC base station is read and decoded.

Information relative to the EC base station and the received EC-SIB are locally stored as part of step S6. Such information comprise in particular the fields received with the EC-SIB, a frequency band of the EC-BS, the repetition rate for decoding the signals. Further it preferably comprises the information concerning the frequency chunk i.e. the corresponding 1.4 MHz band out-of the overall served bandwidth forming an EC-support band. In this band M-SIB1 can be found containing location of all further M-SIB information and the SystemInfoValue tag. From further M-SIBs allowed access parameters such as frequency and power partially depending on EC-class can be derived.

The information are preferably permanently stored for having access even after a power down situation. I.e. only a comparison of SystemInfoValue tag is needed to confirm that relevant information have not been changed. In particular for stationary wireless devices these previously retrieved information might be useful if there is no time to carry out or at least save the time required for the steps S2 to S6 between camping and the jamming attempt.

After that the wireless device carries on with normal operation in step S7 on the serving normal coverage base station.

According to this embodiment it is regularly checked in step S8 if a jamming condition is detected affecting the operation on the serving base station. Preferably this is done asynchronous, but here shown as part of the process flow.

As shown above, for each cellular technology standard methods for quickly detecting a jamming situation are available, and hence incorporated by reference. In any case that shows, that the present invention is applicable to all those types of cellular technology standards supported by the serving normal coverage base station.

The process flow branches to step S9, if no jamming is detected. Here it is checked if the information stored for the EC-base stations is still valid and up to date. Preferably this is done by checking the SystemInfoValue tag of the EC-SIB. If this is decodable and unchanged, it is acknowledged that the stored information for the EC-BS is still valid and up to date, so the operation continues with step S7.

However, if a jamming situation is detected in step, then in step S10 the information stored during S6 are retrieved and in step S11 it is attempted to carry out a reselection to the enhanced coverage base station. Then the wireless device operates with the EC-BS in enhanced coverage.

When this reselection is carried out, it is preferably identified if the jamming condition also affects the EC-BS, or only the previously serving base station. Once the reselection was successful, a jamming indication message is sent to the remote service center, in particular an alarm center, by operating in enhanced coverage. The destination coordinates of the remote service center, in particular MS-ISDN or URL or IP-address, are previously configured in the wireless device. As it is a security device, these information are for other intrusion situations are anyhow needed.

The jamming indication message comprises the necessary information for the remote service center. As the operation in enhanced coverage massively reduces the bandwidth for operation, it is preferably to send only the really required information. This could be at least either co-ordinates (or deltas thereof), or a device identifier for a stationary device, plus a code indicating the type of message.

This exemplifying process flow shows how the wireless device is better secured than in known solutions with only one wireless data link. Thus, a detected jamming situation is quickly identified and reported.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for handling of a jamming condition affecting a wireless device operating in normal coverage mode with a first base station of a cellular network,
    wherein the wireless device is configured for operating in enhanced coverage mode, and for detecting the jamming condition affecting the wireless device,
    comprising the steps for the wireless device of:
        determining of at least one enhanced coverage base station, which is a base station supporting enhanced coverage mode, providing signals sufficient for decoding in enhanced coverage mode,
        receiving enhanced coverage system information broadcast from said enhanced coverage base station,
        storing data relating to at least one of received enhanced coverage system information broadcast and the enhanced coverage base station,
    in case of detection of the jamming condition by the wireless device affecting signals from current first base station:
        checking ability to decode signals from said enhanced coverage base station indicated by said stored data for operating in enhanced coverage mode,
        in case downlink signals of said enhanced coverage base station are decodable in enhanced coverage, starting operation with said enhanced coverage base station in enhanced coverage mode, and
        sending a jamming indication message to a remote server accessible via the cellular network by means of said enhanced coverage base station.

2. Method according to claim 1,
    wherein said checking for ability to decode signals comprises carrying out a reselection operation.

3. Method according to claim 1,
    wherein the enhanced coverage base station is the same base station as the first base station.

4. Method according to claim 1,
    wherein the first base station operates in a different radio technology than the enhanced coverage base station.

5. Method according to claim 1,
further comprising the step, after storing said data, of regularly monitoring said enhanced coverage system information broadcast for a change indication, indicating a change in the enhanced coverage system information broadcast,
upon detection of a change indication repeating said receiving and storing steps.

6. Method according to claim 1,
wherein said jamming indication message is sent by means of a random access channel.

7. Method according to claim 1,
wherein upon detecting of the jamming condition of the enhanced coverage base station, indicating in the jamming indication message whether signals received from the enhanced coverage base station are being affected by jamming.

8. Wireless device operating in normal coverage mode with a first base station of a cellular network, further configured for operating in enhanced coverage mode, wherein the wireless device is configured for detecting a jamming condition affecting the wireless device to
determine of at least one enhanced coverage base station, which is a base station supporting enhanced coverage mode, providing signals sufficient for decoding in enhanced coverage mode,
receive enhanced coverage system information broadcast from said enhanced coverage base station,
store data relating to at least one of received enhanced coverage system information broadcast and the enhanced coverage base station,
in case of detection of the jamming condition by the wireless device affecting signals from current first base station:
check for ability to decode signals of said enhanced coverage base station indicated by said stored data for operating in enhanced coverage mode,
in case downlink signals of said enhanced coverage base station are decodable in enhanced coverage, start operation with said enhanced coverage base station in enhanced coverage mode, and
send a jamming indication message to a remote service by means of said enhanced coverage base station.

9. Wireless device according to claim 8,
wherein the wireless device is an alarming device, and the jamming indication message is sent to an alarm center.

10. Wireless device according to claim 8, further configured, as part of checking for ability to decode signals, to carry out a reselection operation.

11. Wireless device according to claim 8, further configured to support at least two different radio technologies, and
to camp on the first base station supporting a different radio technology than the enhanced coverage base station.

12. Wireless device according to claim 8, further configured, after storing said data, regularly monitoring said enhanced coverage system information broadcast for a change indication, to indicate a change in the enhanced coverage system information broadcast, and
upon detection of a change indication to repeat said receiving and storing.

13. Wireless device according to claim 8, wherein the jamming message is sent by means of a random access channel.

14. Wireless device according to claim 8, further configured to detect upon checking the jamming condition of enhanced coverage base station and to indicate in the jamming indication message whether signalling received from the enhanced coverage base station is affected by jamming.

15. Wireless device according to claim 8, wherein the wireless device is operated stationary.

* * * * *